(12) United States Patent
Toriumi (10) Patent No.: US 9,141,895 B2
(45) Date of Patent: Sep. 22, 2015

(54) INFORMATION PROCESSING APPARATUS, DATA EDITING METHOD, AND COMPUTER PROGRAM PRODUCT

(71) Applicant: Takashi Toriumi, Kanagawa (JP)

(72) Inventor: Takashi Toriumi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/082,583

(22) Filed: Nov. 18, 2013

(65) Prior Publication Data

US 2014/0153045 A1 Jun. 5, 2014

(30) Foreign Application Priority Data

Dec. 3, 2012 (JP) ................. 2012-264229

(51) Int. Cl.
*G06F 3/12* (2006.01)
*G06K 15/02* (2006.01)
*G06K 15/00* (2006.01)

(52) U.S. Cl.
CPC .......... *G06K 15/1894* (2013.01); *G06F 3/1205* (2013.01); *G06F 3/1256* (2013.01); *G06F 3/1285* (2013.01); *G06K 15/402* (2013.01)

(58) Field of Classification Search
USPC .............. 358/1.11, 1.13, 1.15, 527, 1.9, 1.14; 705/300, 301
See application file for complete search history.

(56) References Cited

U.S. PATENT DOCUMENTS

| 8,164,765 | B2 * | 4/2012 | Anno et al. ................... 358/1.13 |
| 8,553,283 | B2 * | 10/2013 | Yamazaki ....................... 358/1.9 |
| 8,687,208 | B2 * | 4/2014 | Nakatsuka .................... 358/1.13 |
| 2007/0109581 | A1 | 5/2007 | Saitoh |
| 2008/0144065 | A1 * | 6/2008 | Jacobs et al. ................. 358/1.13 |
| 2009/0279133 | A1 * | 11/2009 | Nakatsuka .................... 358/1.15 |
| 2012/0026519 | A1 * | 2/2012 | Yoshida ........................ 358/1.11 |

FOREIGN PATENT DOCUMENTS

| JP | 2007-157121 | 6/2007 |
| JP | 2010-122893 | 6/2010 |

* cited by examiner

*Primary Examiner* — Allen H Nguyen
(74) *Attorney, Agent, or Firm* — Oblon, McClelland, Maier & Neustadt, L.L.P.

(57) ABSTRACT

An information processing apparatus includes a first controller, a data editor, and a second controller. The first controller is configured to display a data editable preview window based on job data created from input data and receive data editing operation through the preview window. The data editor is configured to edit the job data in accordance with the data editing operation received through the preview window. The second controller is configured to transmit, to an output device, output data converted from the edited job data and request the output device to execute job processing.

10 Claims, 6 Drawing Sheets

INFORMATION PROCESSING APPARATUS, DATA EDITING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-264229 filed in Japan on Dec. 3, 2012.

BACKGROUND OF THE INVENTION

1. Field of the Invention

The present invention relates to a technique for editing data.

2. Description of the Related Art

In recent print-on-demand (POD) services, for example, data to be printed and printing conditions have been diversified. Thus, printing companies have to meet a wide variety of printing requests from customers. For example, one of the requests is to edit data to be printed. More specifically, customers may request to insert one piece of data into another particular piece of data to produce one piece of print data (job data). Such a data editing function is provided as a function of editing software. For example, disclosed in Japanese Patent Application Laid-Open No. 2010-122893 is a technique in which when a paper size is changed during data editing, the drawn position of an image is automatically determined by taking into account the relative position of the image on the paper size for re-layout.

However, in the conventional data editing, the drawn position of an image is automatically determined in accordance with a predetermined condition, so that the operator cannot make an adjustment while checking the finished image.

As described above, since the POD data editing is required to meet a wide variety of printing requests, it is desirable for the operator to be capable of adjusting the layout position of an image while checking the finished image.

Therefore, there is a need for an information processing apparatus and a data editing method that allow document data to be edited so as to satisfy requests for printing.

SUMMARY OF THE INVENTION

An information processing apparatus includes a first controller, a data editor, and a second controller. The first controller is configured to display a data editable preview window based on job data created from input data and receive data editing operation through the preview window. The data editor is configured to edit the job data in accordance with the data editing operation received through the preview window. The second controller is configured to transmit, to an output device, output data converted from the edited job data and request the output device to execute job processing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An information processing apparatus, a data editing method, and a data editing program according to embodiments will be described in detail below with reference to the accompanying drawings.

System Configuration

Figure 1:
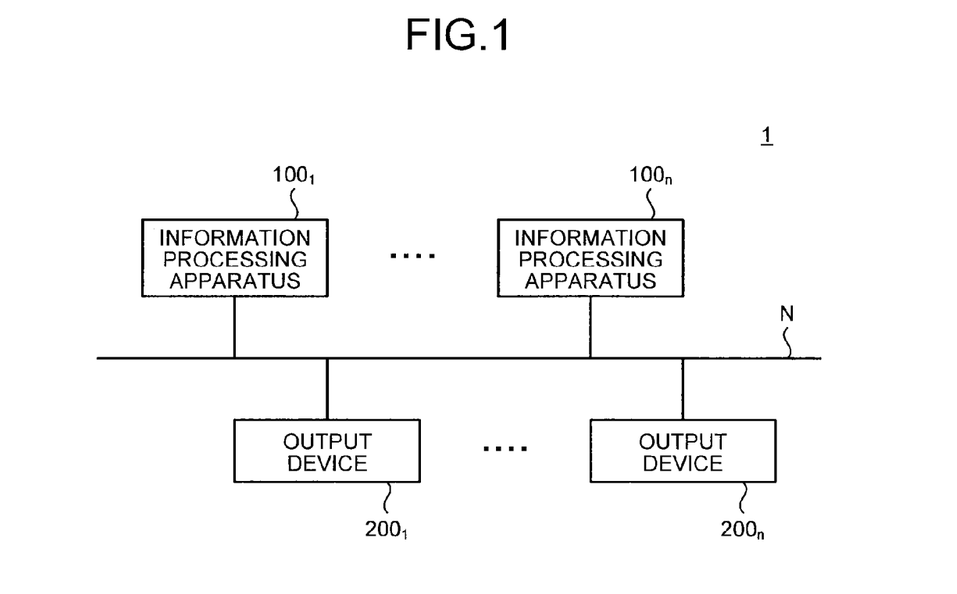
FIG. 1 is a view illustrating an example of the configuration of a data editing system according to an embodiment.

FIG. 1 is a view illustrating an example of the configuration of a data editing system 1 according to the embodiment. FIG. 1 illustrates an example in which one or more information processing apparatuses $100_1$ to $100n$ and one or more output devices $200_1$ to $200n$ are connected to a predetermined data transmission path N (for example, "network"). Note that hereinafter, "the information processing apparatus 100" will be used to collectively refer to the information processing apparatuses $100_1$ to $100n$, while "the output device 200" will be used to collectively refer to the output devices $200_1$ to $200n$.

The information processing apparatus 100 that has an information processing function is, for example, a personal computer (PC). The output device 200 that has an image processing function is, for example, a printer or multifunction peripherals (MFP).

The data editing system 1 according to the embodiment provides the following services. The information processing apparatus 100 creates the data of a requested job (hereinafter to be referred to as the "job data") based on input data. Next, the information processing apparatus 100 displays a preview window based on the job data, and executes data editing in accordance with a control command received through the displayed window. At this time, the information processing apparatus 100 can edit data, for example, by page insertion or job merging (data merging). Furthermore, the information processing apparatus 100 can set conditions, for example, for printing or postprocessing. Subsequently, the information processing apparatus 100 converts the edited job data to printable data, which is then transmitted to the output device 200, and requests to execute job processing. As a result, the output device 200 outputs the printed matter on which the data editing is reflected.

Hardware Configuration

Figure 2:
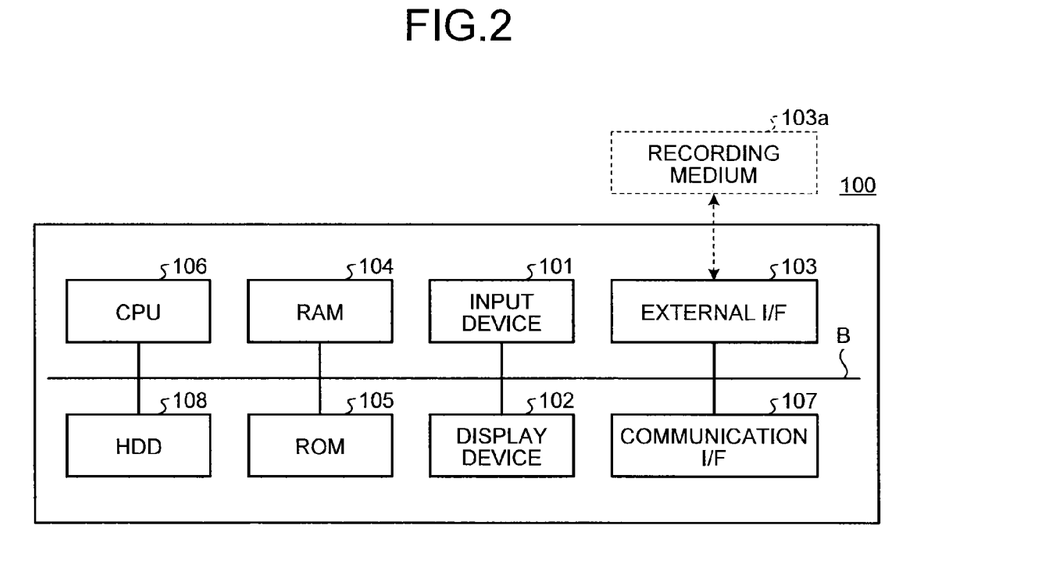
FIG. 2 is a view illustrating an example of the hardware configuration of an information processing apparatus according to the embodiment.

FIG. 2 is a view illustrating an example of the hardware configuration of the information processing apparatus 100 according to the embodiment. As shown in FIG. 2, the information processing apparatus 100 includes an input device 101, a display device 102, and an external interface (I/F) 103. The information processing apparatus 100 further includes a random access memory (RAM) 104, a read only memory (ROM) 105, and a central processing unit (CPU) 106. The information processing apparatus 100 also includes a communication I/F 107 and a hard disk drive (HDD) 108. The information processing apparatus 100 has the aforementioned components connected to each other through a bus B.

The input device 101 includes a keyboard, a mouse, and the like, and is used to input control signals to the information processing apparatus 100. The display device 102 includes a display and the like, and displays the result of processing performed by the information processing apparatus 100.

The communication I/F 107 connects the information processing apparatus 100 to a data transmission path N. This allows the information processing apparatus 100 to be capable of performing data communications with other devices through the communication I/F 107.

The HDD 108 is a nonvolatile storage device for storing programs and data. The stored programs and data may include, for example, the operating system (OS) or basic software for controlling the entire apparatus and application software for providing various types of functions on the OS. Furthermore, the HDD 108 manages the stored programs and data in a predetermined file system and/or data base (DB).

The external I/F 103 serves as an interface with an external device. The external device may be, for example, a recording medium 103a. This configuration allows the information processing apparatus 100 to read and/or write from/on the recording medium 103a through the external I/F 103. Note that the recording medium 103a may include, for example, a floppy (trade mark) disk, a compact disk (CD), a digital versatile disk (DVD), and a memory card.

The ROM 105 is a nonvolatile semiconductor memory device (storage device) which can hold internal data even when the power is turned off. The ROM 105 stores programs and data such as the basic input/output system (BIOS) to be executed at a start-up of the information processing apparatus 100, OS settings, and network settings. The RAM 104 is a volatile semiconductor memory device for temporarily holding programs and data. The CPU 106 is an arithmetic unit which reads programs and data onto the PAM from the aforementioned storage devices (for example, the "HDD" or "ROM") to execute processing, thereby controlling the entire apparatus and implementing mounted functions.

As described above, in the embodiment, the aforementioned system and the hardware configuration can provide the data editing function.

Data Editing Function

A description will be now given of the data editing function according to the embodiment.

The information processing apparatus 100 according to the embodiment creates job data based on input data. The information processing apparatus 100 displays a data editable preview window based on the job data. The information processing apparatus 100 receives data editing operation from the operator through the preview window. The information processing apparatus 100 edits job data in accordance with the received data editing operation. The information processing apparatus 100 transmits, to the output device 200, the output data converted from the edited job data. The information processing apparatus 100 according to the embodiment has the data editing function as described above.

In the conventional data editing, since a drawn position of an image has been automatically determined based on a predetermined condition, it is not possible for the operator to make an adjustment while checking the finished image.

For example, the data editing includes the page insertion in which one piece of input data is inserted into particular input data. In the case of the page insertion, a page of the inserted data may be inserted in between the preceding and subsequent pages that are different in size from the inserted page. As a result, the requested job may lead to printing in different paper sizes. If the job request at this time is a request for up to bookbinding, the bookbinding may be unpreferably performed on different mixed paper sizes.

Thus, in the conventional data editing, when different paper sizes are resized to the same size, the relative position of an image on the resized paper is taken into account to automatically determine the drawn position of the image for re-layout. However, to meet the job request with accuracy, it is preferable for the operator to adjust the image drawn position while checking the finished image.

In this context, the data editing function according to the embodiment is configured such that the data editing operation is received from the operator through the preview window and then the job data is edited in accordance with the received data editing operation.

This allows the data editing function according to the embodiment to provide an environment in which the operator can adjust the image drawn position while checking the finished image. As a result, the data editing function according to the embodiment enables editing of the input data to meet the request for printing.

Now, a description will be made to the configuration of the data editing function according to the embodiment and the operation thereof.

Figure 3:
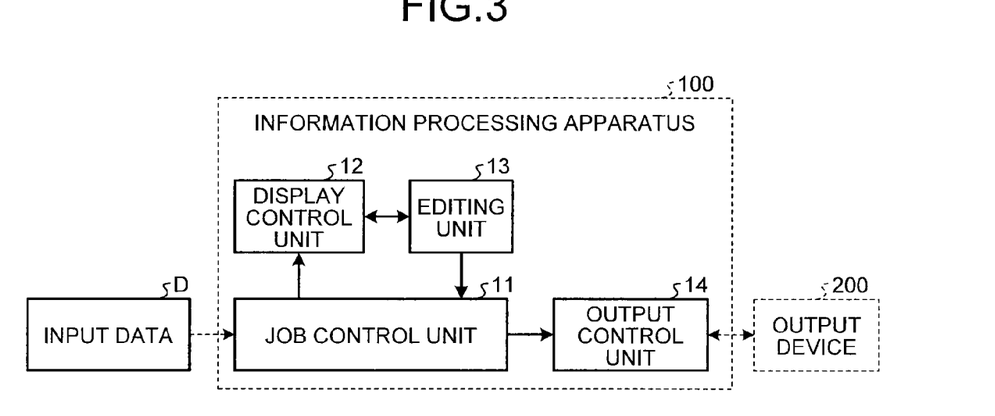
FIG. 3 is a view illustrating an example of the configuration of a data editing function according to the embodiment.

FIG. 3 is a view illustrating an example of the configuration of the data editing function according to the embodiment. As shown in FIG. 3, the data editing function according to the embodiment mainly includes a job control unit 11, a display control unit 12 (a first controller), an editing unit 13 (a data editor), and an output control unit (a second controller) 14.

The job control unit 11 is a functional unit for controlling requested job processing. The job control unit 11 receives, for example, input data D (data to be processed) such as documents or images, and a job ticket (for example, definition data in a job definition format (JDF)) in which job processing condition settings such as a printing condition setting and a postprocessing condition setting are defined. Based on the input data D and the job ticket, the job control unit 11 creates job data which contains the job processing condition setting to be executed by the output device 200. Note that the job processing condition setting include, for example, a printing condition setting, such as a paper size (page size) and an imposition (multiple pages per sheet), and a postprocessing condition setting such as stapling and punching.

The display control unit 12 is a functional unit which creates a preview window and controls the displaying of a preview window on the display device 102 and the reception of data editing operation for the preview window. The display control unit 12 creates, based on the job data, image data representing a result of job execution. The display control unit 12 displays the created image data on the preview window. For example, when 2-up printing (printing two pages per sheet) and two-hole punching on left side of the center of sheet are set in the job data, the display control unit 12 displays on the preview window, as the job execution result, a resulting print image showing that two pages are printed per sheet and two holes are punched on left side of the center of the sheet.

Furthermore, the display control unit 12 creates the preview window on which data is editable and displays the preview window on the display device 102. The display control unit 12 creates the preview window provided with an user interface (UI) (not illustrated) to receive data editing operation from the operator. This allows the display control unit 12 to receive, from the operator through the preview window, various types of data editing operation such as changing the job execution condition setting or editing the layout.

The editing unit 13 is a functional unit which edits the job data in accordance with the data editing operation. In accordance with a command for changing the job execution condition setting, the editing unit 13 changes information representing the job execution condition contained in the job data (hereinafter to be referred to as the "job execution condition information") to information representing the changed job execution condition setting. For example, when a command for changing the setting of the paper size from B5 to A4 is received, the following change in the setting will be made. The editing unit 13 changes the setting value of the paper size from B5 set in the job data to A4. Furthermore, in accordance with a layout editing command, the editing unit 13 updates information representing the layout contained in the job data (hereinafter to be referred to as the "layout information") to information representing the edited layout. For example, when a command for displacing an image on a sheet having a certain paper size is received, the following information change is made. The editing unit 13 changes information representing a drawn position of an image in the job data (hereinafter to be referred to as the "drawn position information") to information representing a drawn position of the displaced image.

The output control unit 14 is a functional unit which transmits output data and requests the output device 200 to execute job processing. The output control unit 14 converts the edited job data to data (output data) that is executable on the output device 200. The output control unit 14 identifies the data format that is executable on the output device 200, based on device information and function information acquired from the output device 200 that requests for job processing. The output control unit 14 converts the edited job data in accordance with the identified data format. For example, when the output device 200 can print data in the PostScript format, the data is converted as follows. That is, the output control unit 14 employs a predetermined Page Description Language (PDL) data conversion function to convert the edited job data into PostScript data.

As described above, the data editing function according to the embodiment is implemented by the information processing apparatus 100 allowing a data editing program to be executed and each of the aforementioned functional units to be cooperatively operated.

The data editing program is recorded and provided, in an installable format or executable format file, on the recording medium 103a readable by the information processing apparatus 100 (computer) that is an execution environment. The data editing program has a modular configuration that includes each of the aforementioned functional units, so that the CPU 106 reads the program on the recording medium 103a and then executes the program, thereby producing each functional unit on the RAM 104. Note that the provision of the data editing program is not limited to this method. For example, it is also acceptable to store the data editing program in a device connected to the Internet or the like, then allowing the data editing program to be downloaded through a network. Furthermore, it is also acceptable to provide the program that has been incorporated in advance into a storage device such as the ROM 105.

Now, referring to a flowchart, a description will be made to the processing of executing the data editing program (the cooperative operation of each functional unit). Note that the following description is assumed an editing scene where a page of input data of paper size B5 is inserted into input data of a paper size A4 and a single-stapling on upper left corner is set. Thus, a description will be made below to the procedure of data editing, as well as a specific example of input data, an example of a preview window, and an example of data editing on a window.

Data Editing

Figure 4:
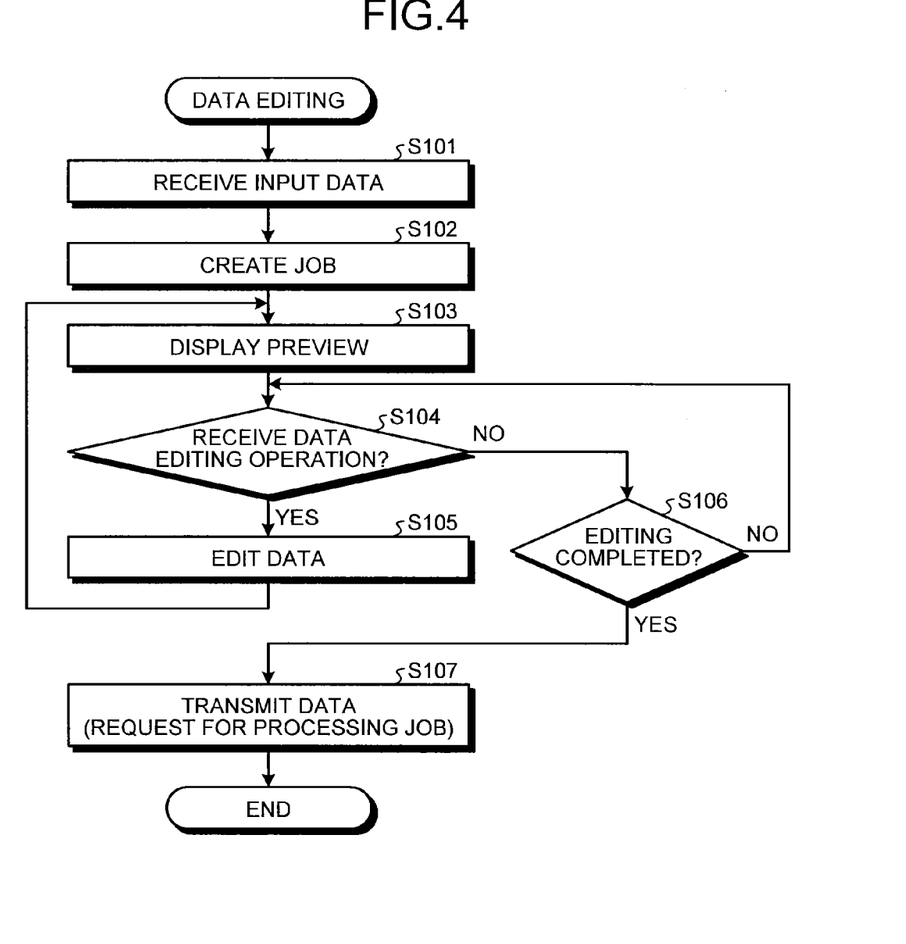
FIG. 4 is a flowchart illustrating an example of the procedure of editing data according to the embodiment.
Figure 5:
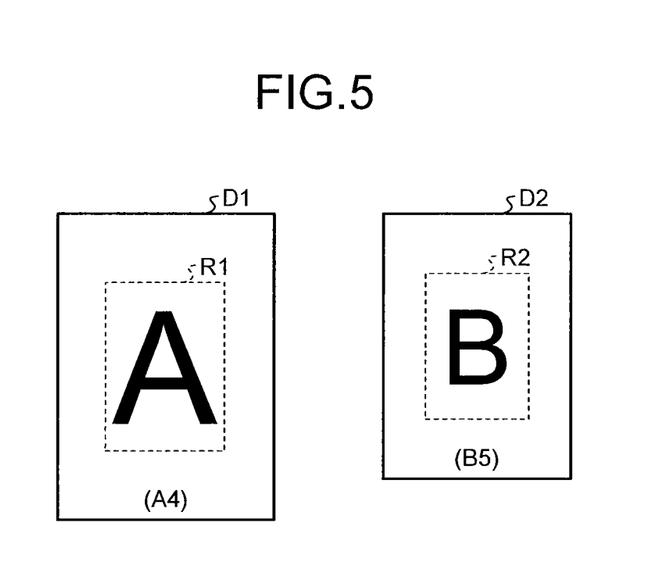
FIG. 5 is a view illustrating an example of input data according to the embodiment.
Figure 6:
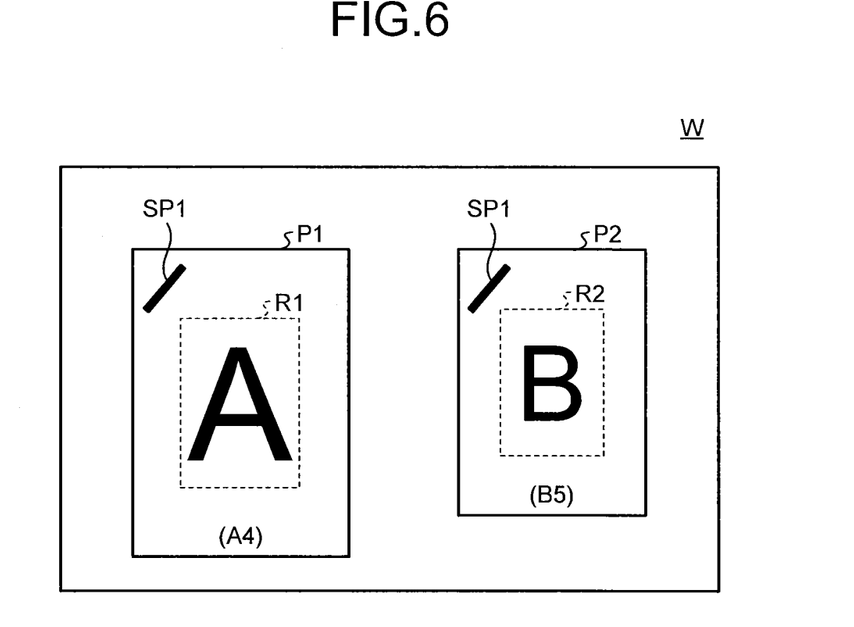
FIG. 6 is a view illustrating a first example of a preview window according to the embodiment.

FIG. 4 is a flowchart showing an example of the procedure of data editing according to the embodiment. Furthermore, FIG. 5 is a view illustrating an example of input data according to the embodiment. Furthermore, FIG. 6 is a view illustrating a first example of a preview window according to the embodiment.

As shown in FIG. 4, the job control unit 11 receives input data D1 and D2 of different paper sizes (step S101). At this time, the job control unit 11 receives, in conjunction with the input data D1 and D2, a job ticket which defines a job processing condition. FIG. 5 illustrates an example of data that the job control unit 11 receives. More specifically, illustrated are the examples of the input data D1 of paper size A4 and the input data D2 of paper size B5. Furthermore, FIG. 5 illustrates an example of drawn regions R1 and R2 of respective pieces of input data D1 and D2. The job control unit 11 receives such pieces of input data D1 and D2.

Referring back to FIG. 4, the job control unit 11 creates job data based on the received input data D1 and D2 and the job ticket (step S102). At this time, the job control unit 11 creates the job data containing a job processing condition setting to be executed by the output device 200. More specifically, created is the job data that has a printing condition setting of mixed paper sizes A4 and B5 and a postprocessing condition setting of single-stapling on upper left corner. The job control unit 11 sends the created job data to the display control unit 12.

As a result, the display control unit 12 creates a preview window W based on the created job data and displays the preview window W on the display device 102 (step S103). At this time, the display control unit 12 includes a user interface (UI) for receiving operation for editing data from the operator and creates a preview window on which data can be edited. FIG. 6 illustrates an example of the window that the display control unit 12 displays. More specifically, illustrated is an example of the preview window W which displays resulting bookbinding images printed with mixed paper sizes P1 (A4) and P2 (B5) and stapled at the position SP1 on upper left corner. Note that FIG. 6 shows an example in which drawn regions R1 and R2 of the respective pieces of document data D1 and D2 are displayed; however, the embodiment is not limited thereto. That is, selection to display or not to display the drawn regions R1 and R2 is available with a setting through the preview window W.

Now, referring back to FIG. 4, the display control unit 12 determines whether the user's operation received through the preview window W (UI) is one of various types of data editing operation (step S104). The various types of data editing control received at this time include user's operation for changing the job execution condition setting or operation for editing the layout. In the embodiment, for example, received is operation for changing the printing condition setting from paper size B5 to A4 or operation for changing the postprocessing condition setting from single-stapling on upper left corner to double-stapling on left side. Furthermore, in the embodiment, received is operation for displacing an image on a sheet whose paper size is changed from B5 to A4 to adjust the drawn position R2.

When the data editing operation is received (step S104: YES), the editing unit 13 edits the job data in accordance with the received data editing operation (step S105). At this time, the editing unit 13 receives, from the display control unit 12, a data editing command that follows the received operation event. The editing unit 13 edits the job data based on the data editing command. More specifically, the editing unit 13 changes, in accordance with the command for changing the job execution condition setting, the job execution condition information, which includes the printing condition setting information of the job data and/or the postprocessing condition setting information, to information representing the changed job execution condition setting. Furthermore, the editing unit 13 updates, in accordance with the layout editing command, the layout information including the drawn position information of an image contained in the job data to information representing drawn position information of the displaced image. Upon completion of the commanded data editing, the editing unit 13 commands the display control unit 12 to display the preview window W on which the data editing is reflected. As a result, based on the edited job data (i.e., the changed information), the display control unit 12 creates the preview window W and re-displays the preview window W on the display device 102 (step S103).

On the other hand, if the operation received through the preview window W is not one of various types of data editing control (step S104: NO), the display control unit 12 determines whether the received operation indicates completion of the data editing (step S106).

If the received operation does not indicates completion of the data editing (step S106: NO), the display control unit 12 moves back to the processing of step S104 so as to proceed to a state to wait for receiving various types of data editing operation.

If the completion of the data editing operation is received (step S106: YES), the job control unit 11 commands the output control unit 14 to execute the job processing of the edited job data. At this time, the job control unit 11 sends, to the output control unit 14, the edited job data received at the time of the completion of the data editing operation from the editing unit 13.

As a result, the output control unit 14 transmits, in response to the received command, the output data converted from the edited job data to the output device 200 (step S107). At this time, the output control unit 14 converts the edited job data into data (output data) that is executable on the output device 200. This allows the information processing apparatus 100 to request the output device 200 to execute the job processing.

Now, a description will be made in detail to the processing (steps S103 to S106) to be executed between the display control unit 12 and the editing unit 13.

Processing Between the Display Control Unit 12 and the Editing Unit 13

Figure 7:
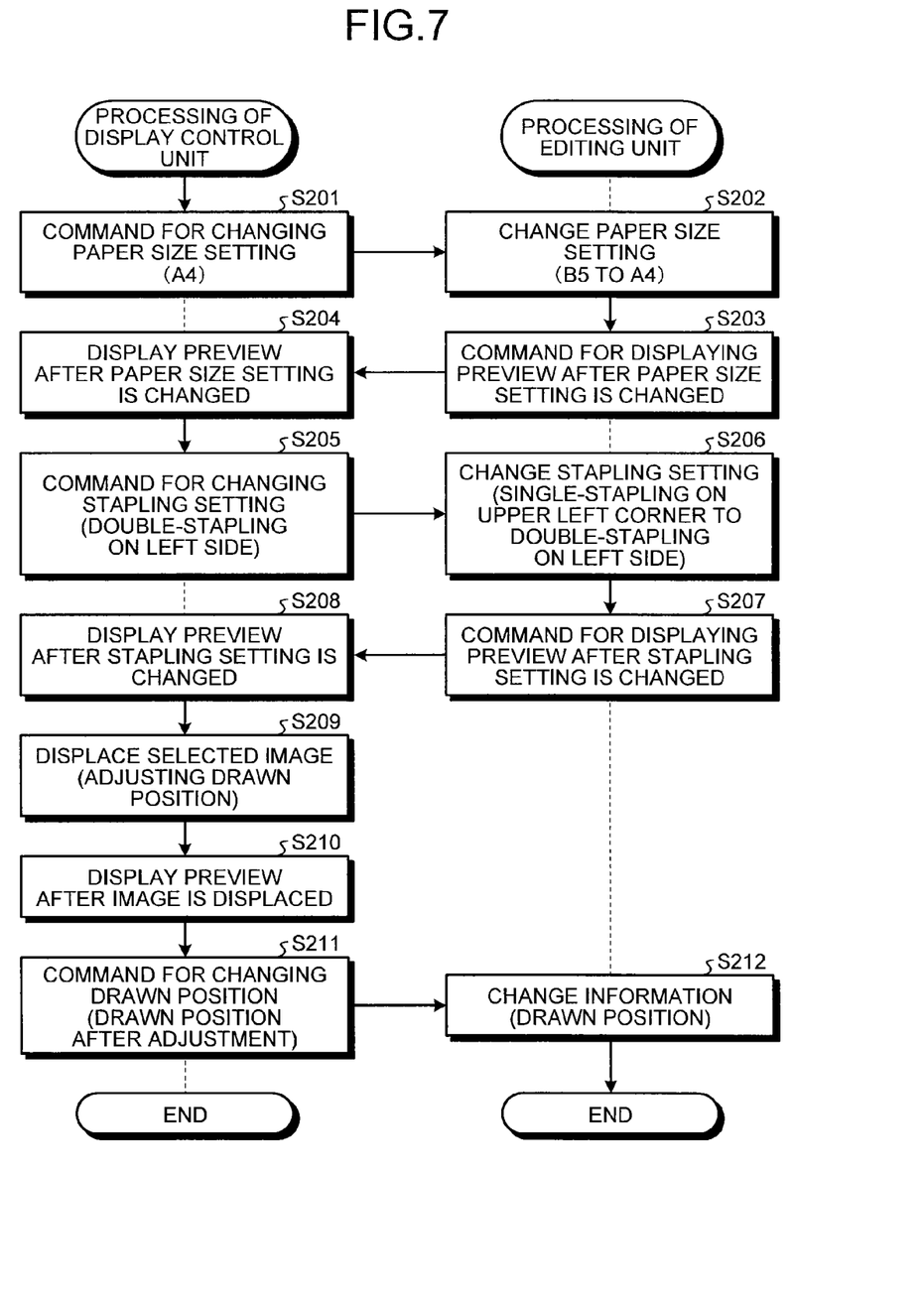
FIG. 7 is a sequence diagram illustrating an example of the procedure of processing in a display control unit and an editing unit according to the embodiment.
Figure 8:
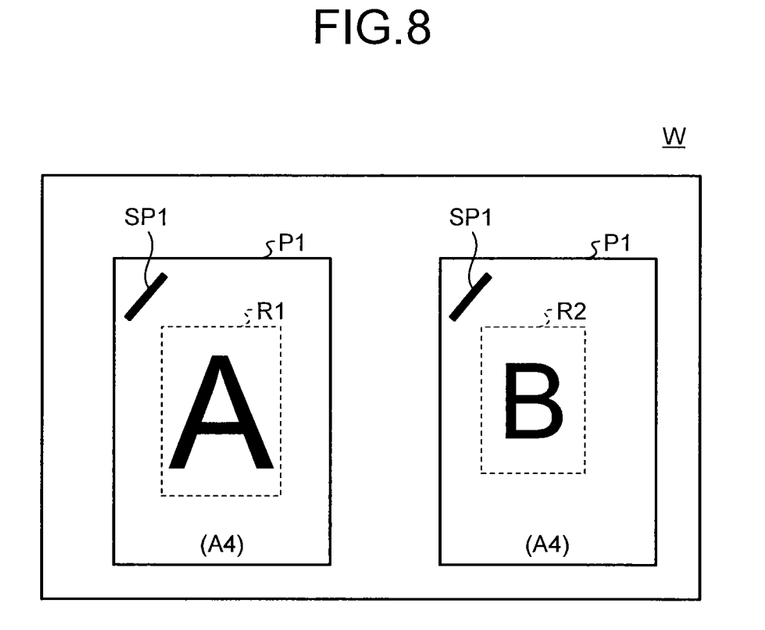
FIG. 8 is a view illustrating a second example of the preview window according to the embodiment.
Figure 9:
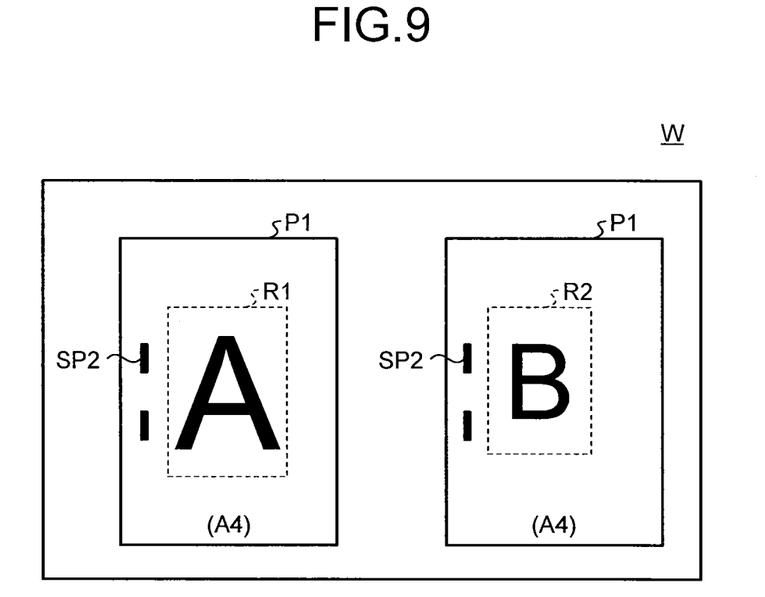
FIG. 9 is a view illustrating a third example of the preview window according to the embodiment.
Figure 10:
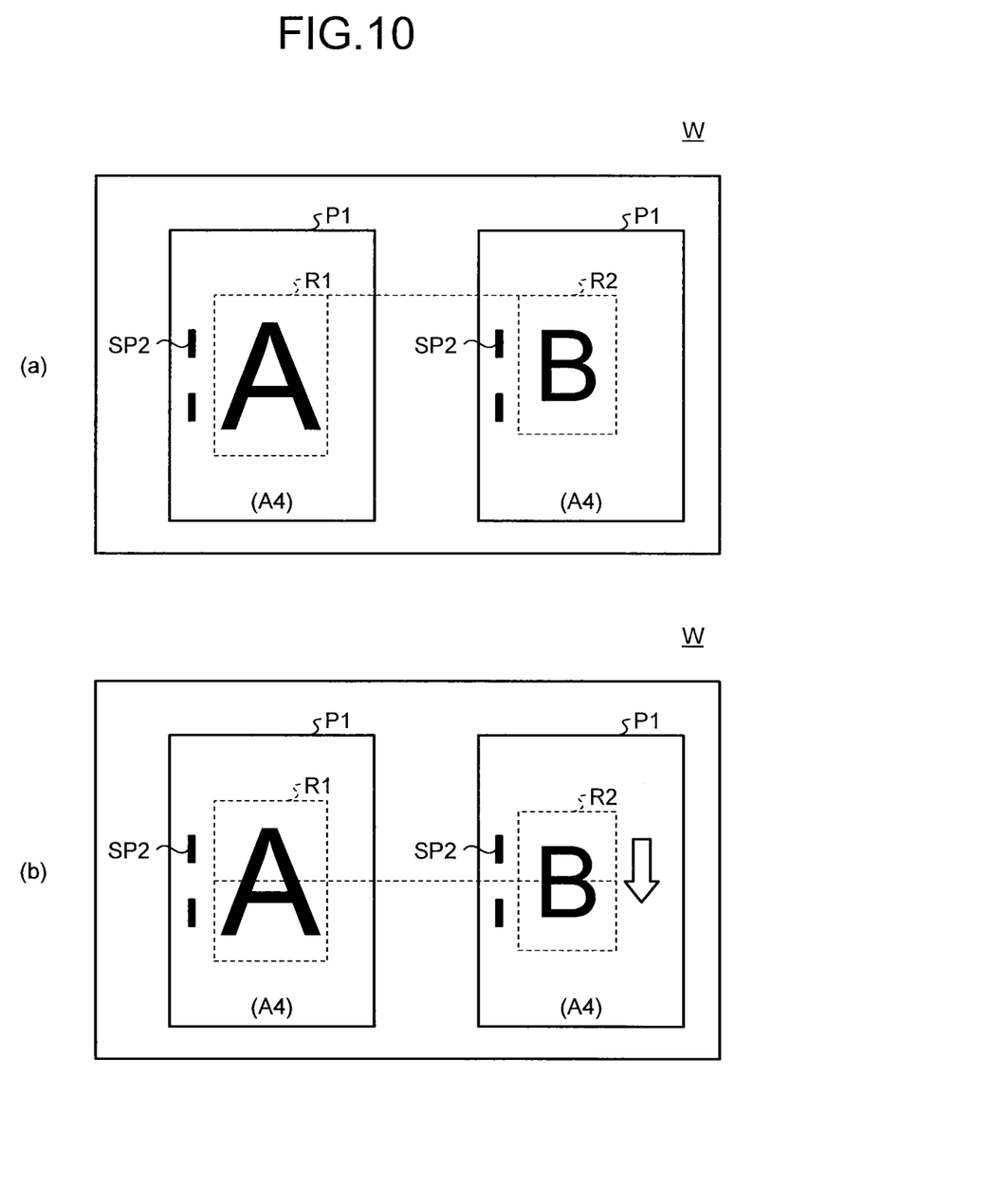
FIG. 10 is a view illustrating an example of data editing on a window according to the embodiment.

FIG. 7 is a sequence diagram illustrating an example of the procedure of processing in the display control unit 12 and the editing unit 13 according to the embodiment. Furthermore, FIG. 8 is a view illustrating a second example of the preview window according to the embodiment. FIG. 9 is a view illustrating a third example of the preview window according to the embodiment. Furthermore, FIG. 10 is a view illustrating an example of data editing on a window according to the embodiment. Note that in the following description, the following data editing operation is assumed to be provided by the operator. The operator changes the paper size setting from B5 to A4. Next, the operator changes the stapling setting from single-stapling on upper left corner to double-stapling on left side. Finally, the operator displaces the image on a sheet whose paper size is changed to A4 so as to adjust the image drawn position R2 to a position suitable for the changed paper size (the position desirable as finish).

As shown in FIG. 7, upon reception of the operation for changing the paper size setting from B5 to A4, the display control unit 12 commands the editing unit 13 to change the paper size setting (step S201). The editing unit 13 changes, in accordance with the received command, the paper size setting value contained in the job data from B5 to A4 (step S202). Subsequently, the editing unit 13 commands the display control unit 12 to display the preview window W showing a result of the change in the paper size (step S203). As a result, the display control unit 12 displays, as the preview window W, the resulting bookbinding image with the paper size changed from B5 to A4 (step S204).

FIG. 8 illustrates an example of the window that the display control unit 12 displays. At this time, the display control unit 12 displays, as the preview window W, the resulting bookbinding images printed with the unified paper size P1 (A4) and stapled at the position SP1 on upper left corner. Furthermore, the display control unit 12 determines the image drawn position R2 based on the coordinates with their origin at upper left of the sheet whose paper size is changed to A4 and displays the image. As described above, according to the data editing function of the embodiment, it is possible for the operator to change the printing condition setting while checking, on the preview window W, the resulting bookbinding available after the change in the setting.

Now, referring back to FIG. 7, upon reception of the operation for changing the stapling setting from single-stapling on upper left corner to double-stapling on left side, the display control unit 12 commands the editing unit 13 to change the stapling setting (step S205). The editing unit 13 changes, in accordance with the received command, the stapling setting value contained in the job data from single-stapling on upper left corner to double-stapling on left side (step S206). Subsequently, the editing unit 13 commands the display control unit 12 to display the preview window W available after the change in the stapling setting (step S207). As a result, the display control unit 12 displays, as the preview window W, the resulting bookbinding images obtained when one stapling position on upper left corner is changed to two stapling positions on left side (step S208).

FIG. 9 illustrates an example of the window that the display control unit 12 displays. At this time, the display control unit 12 displays, as the preview window W, the resulting bookbinding images printed with the unified paper size P1 (A4) and stapled at the positions SP2 on left side. As described above, according to the data editing function of the embodiment, it is possible for the operator to change the postprocessing condition setting while checking, on the preview window W, the resulting bookbinding available after the setting is changed.

Now, referring back to FIG. 7, upon reception of operation for displacing the image on a sheet whose paper size is changed to P1 (A4), the display control unit 12 displaces, in accordance with the received operation, an image selected on the preview window W (step S209).

FIG. 10 illustrates an example of data editing on the preview window W by the display control unit 12. More specifically, FIG. 10(a) illustrates an example before the image is displaced. First, as shown in section (a) of FIG. 10, the display control unit 12 displays, as the preview window W, the resulting bookbinding image printed with the unified paper size P1 (A4) and stapled at the two positions SP2 on left side. Subsequently, through the preview window W, the display control unit 12 receives operation for selecting an image to be edited and operation for displacing the selected image.

Note that in the case of the drawn position R2 as shown in section (a) of FIG. 10, the operator makes the following adjustment. As shown in section (a) of FIG. 10, since the drawn position R2 is automatically determined based on the coordinates with their origin at the upper left of the sheet, the right side and the lower side of the page have too large a margin on the sheet whose paper size is changed to P1 (A4), resulting in an unbalanced layout. In this context, the operator may think that the drawn position R2 should be adjusted based on the coordinates with their origin at the center in the vertical direction of the sheet so as to provide a balanced layout. In this case, the operator should displace the selected image downwardly. The operation for displacing the image through the user interface (UI) at this time is dragging the image to be edited on the preview window W and then dropping the image in place, for example. Note that the operation for displacing an image is not limited thereto. For example, it may also be input operation as follows. Scales indicating reference coordinate values are displayed on the preview window W, and the operator inputs input values for an amount of displacement by referring to the value of the scales. In this manner, on the preview window W, the image on the sheet whose paper size is changed to P1 (A4) is displaced to adjust the drawn position R2.

Now, referring back to FIG. 7, this results in the display control unit 12 displaying, as the preview window W, the resulting bookbinding image available after the displacement of the image (i.e., the resulting bookbinding images obtained when the image drawn rendering position R2 is adjusted) (step S210).

Section (b) of FIG. 10 illustrates an example after the image is displaced. As shown in section (b) of FIG. 10, the display control unit 12 displays, as the preview window W, the resulting bookbinding image in which the image on the sheet of paper size A4 is displaced downward (in the direction of the arrow indicated in the figure) to thereby adjust the rendering position R2. As described above, according to the data editing function of the embodiment, it is possible for the operator to adjust the layout while checking, on the preview window W, the resulting bookbinding available after the adjustment of the drawn position.

Now, referring back to FIG. 7, upon reception of the completion of the adjustment of the image drawn position R2 on the sheet whose paper size is changed to P1 (A4), the display control unit 12 commands the editing unit 13 to change the drawn position R2 (step S211). The editing unit 13 follows the received command so as to change the coordinate values corresponding to the drawn position R2 contained in the job data to the coordinate values available after the adjustment (the downwardly displaced coordinate values) (step S212). Subsequently, the editing unit 13 sends, to the job control unit 11, the job data with the adjusted drawn position R2 and then commands to execute the job processing.

As described above, the data editing function of the embodiment is configured such that while checking the finished image, the operator can change, for example, the job processing condition setting, such as the printing condition setting or the postprocessing condition setting, and adjust the layout such as the image drawn positions R1 and R2. That is, according to the data editing function of the embodiment, it is possible to arbitrarily edit the input data D1 and D2.

As described above, according to the information processing apparatus 100 of the embodiment, the job control unit 11 creates job data based on the input data D1 and D2. The display control unit 12 displays, based on the job data, the preview window W on which data can be edited. The display control unit 12 receives operation for editing data from the operator through the preview window W. The editing unit 13 edits the job data based on the received operation for editing data. The output control unit 14 transmits, to the output device 200, the output data that has been converted from the edited job data.

This allows the information processing apparatus 100 according to the embodiment to provide an environment in which the operator can adjust the image drawn position R2 while checking the finished image. As a result, the information processing apparatus 100 according to the embodiment enables editing of the input data so as to satisfy the request for printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a first controller configured to display a data editable preview window based on job data created based on both input data and a ticket in which a processing condition of the input data is defined, and to receive data editing operation through the preview window;
a data editor configured to edit a job execution condition contained in the job data in accordance with the data editing operation received through the preview window; and
a second controller configured to transmit, to an output device, output data converted from the edited job data, and to request the output device to execute job processing, wherein
the second controller is configured to identify a data format that is executable on the output device based on device information acquired from the output device, and to convert the edited job data into the output data executable on the output device based on the identified data format.

2. The information processing apparatus according to claim 1, wherein when the first controller receives, as the data editing operation, operation for editing a layout through the preview window, the data editor is configured to change layout information contained in the job data to layout information representing the edited layout.

3. The information processing apparatus according to claim 2, wherein when the first controller receives, as the data editing operation, operation for displacing an image through the preview window, the data editor is configured to change information representing a drawn position of the image contained in the job data to information representing another drawn position of a displaced image.

4. The information processing apparatus according to claim 3, wherein the first controller is configured to display, based on the information representing the another drawn position of the displaced image, the preview window on which the operation for displacing the image is reflected.

5. The information processing apparatus according to claim 1, wherein when the first controller receives, as the data editing operation, operation for changing a job execution condition setting through the preview window, the data editor is configured to change information representing the job execution condition contained in the job data to information representing a changed job execution condition setting.

6. The information processing apparatus according to claim 5, wherein when the first controller receives, as the data editing operation, operation for changing a printing condition and/or a postprocessing condition, the data editor is configured to change information representing the printing condition and/or the postprocessing condition contained in the job data to information representing a changed printing condition and/or postprocessing condition.

7. The information processing apparatus according to claim 6, wherein the first controller is configured to display, based on the changed printing condition and/or postprocessing condition, the preview window on which the operation for changing the printing condition and/or the postprocessing condition is reflected.

8. The information processing apparatus according to claim 1, wherein when the job data is created by page insertion based on a plurality of pieces of input data having different paper sizes, the first controller is configured to determine a drawn position of an image on a sheet whose paper size is changed to unify the different paper sizes, based on coordinates with their origin at a predetermined position of the sheet, and displays the image in accordance with the determined drawn position.

9. A data editing method performed in an information processing apparatus that includes a display controller, an editor, and an output controller, the method comprising:
   displaying a data editable preview window based on job data created based on both input data and a ticket in which a processing condition of the input data is defined, and receiving data editing operation through the preview window by the display controller;
   editing, by the editor, a job execution condition contained in the job data in accordance with the data editing operation received through the preview window;
   transmitting, to an output device, output data converted from the edited job data, and requesting the output device to execute job processing by the output controller;
   identifying, by the output controller, a data format that is executable on the output device based on device information acquired from the output device; and
   converting, by the output controller, the edited job data into the output data executable on the output device based on the identified data format.

10. A computer program product comprising a non-transitory computer-readable medium containing data editing program that causes a computer to execute:
   displaying a data editable preview window based on job data created based on both input data and a ticket in which a processing condition of the input data is defined, and receiving data editing operation through the preview window;
   editing a job execution condition contained in the job data in accordance with the data editing operation received through the preview window;
   transmitting, to an output device, output data converted from the edited job data and requesting the output device to execute job processing;
   identifying a data format that is executable on the output device based on device information acquired from the output device; and
   converting the edited job data into the output data executable on the output device based on the identified data format.

\* \* \* \* \*